(12) United States Patent
Afram et al.

(10) Patent No.: US 11,007,994 B2
(45) Date of Patent: May 18, 2021

(54) METHOD AND SYSTEM FOR DECELERATING A VEHICLE

(71) Applicant: Scania CV AB, Södertälje (SE)

(72) Inventors: Kourie Afram, Södertälje (SE); Mats Liwell, Södertälje (SE); Mattias Nilsson, Södertälje (SE); Fredrik Sunden, Hägersten (SE)

(73) Assignee: Scania CV AB, Södertälje (SE)

( * ) Notice: Subject to any disclaimer, the term of this patent is extended or adjusted under 35 U.S.C. 154(b) by 165 days.

(21) Appl. No.: 15/516,971

(22) PCT Filed: Oct. 15, 2015

(86) PCT No.: PCT/SE2015/051089
§ 371 (c)(1),
(2) Date: Apr. 5, 2017

(87) PCT Pub. No.: WO2016/068773
PCT Pub. Date: May 6, 2016

(65) Prior Publication Data
US 2017/0297558 A1 Oct. 19, 2017

(30) Foreign Application Priority Data
Oct. 29, 2014 (SE) .................................... 1451290-9

(51) Int. Cl.
*B60W 20/15* (2016.01)
*B60W 30/18* (2012.01)
(Continued)

(52) U.S. Cl.
CPC ............. *B60W 20/15* (2016.01); *B60K 6/387* (2013.01); *B60L 15/2009* (2013.01);
(Continued)

(58) Field of Classification Search
CPC ..................................................... B60W 20/15
See application file for complete search history.

(56) References Cited

U.S. PATENT DOCUMENTS

| 8,523,296 B2 | 9/2013 | Kikuchi et al. | |
| 2009/0043470 A1* | 2/2009 | Ahn ...................... | B60W 10/04 701/70 |

(Continued)

FOREIGN PATENT DOCUMENTS

| DE | 10209839 A1 | 9/2002 | |
| DE | 10209839 A1 * | 9/2002 | ............ B60W 10/02 |

(Continued)

OTHER PUBLICATIONS

International Search Report for PCT/SE2015/051089 dated Jan. 21, 2016.
Written Opinion of the International Searching Authority for PCT/SE2015/051089 dated Jan. 21, 2016.
International Preliminary Report on Patentability for PCT/SE2015/051089 dated Mar. 1, 2017.
(Continued)

*Primary Examiner* — Imran K Mustafa
(74) *Attorney, Agent, or Firm* — Moore & Van Allen PLLC; W. Kevin Ransom

(57) ABSTRACT

The present invention relates to a method for decelerating a vehicle comprising an electrical machine being arranged to provide a controllable torque to at least one drive wheel, said vehicle including driver controllable means for actively requesting a torque for propelling the vehicle. The method includes, when a driver request for a propelling torque is reduced at least to a first extent: applying a first brake torque by means of said electrical machine, by means of said first brake torque, decelerate said vehicle to a stationary state, and by means of said electrical machine, when said vehicle has been decelerated to said stationary state, continue applying a torque by means of said electrical machine to keep said vehicle in said stationary state.

19 Claims, 4 Drawing Sheets

(51) Int. Cl.

| | | |
|---|---|---|
| *B60W 10/08* | (2006.01) | |
| *B60K 6/387* | (2007.10) | |
| *B60W 20/00* | (2016.01) | |
| *B60W 10/184* | (2012.01) | |
| *B60W 50/10* | (2012.01) | |
| *B60L 15/20* | (2006.01) | |
| *B60W 10/06* | (2006.01) | |
| *B60K 6/48* | (2007.10) | |

(52) U.S. Cl.
CPC ............ *B60W 10/06* (2013.01); *B60W 10/08* (2013.01); *B60W 10/184* (2013.01); *B60W 20/00* (2013.01); *B60W 30/181* (2013.01); *B60W 30/18054* (2013.01); *B60W 30/18109* (2013.01); *B60W 30/18118* (2013.01); *B60W 50/10* (2013.01); *B60K 2006/4825* (2013.01); *B60L 2240/12* (2013.01); *B60L 2240/423* (2013.01); *B60W 2300/10* (2013.01); *B60W 2300/12* (2013.01); *B60W 2510/0225* (2013.01); *B60W 2530/10* (2013.01); *B60W 2540/10* (2013.01); *B60W 2540/12* (2013.01); *B60W 2552/15* (2020.02); *B60W 2710/0666* (2013.01); *B60W 2710/083* (2013.01); *B60W 2720/10* (2013.01); *Y02T 10/62* (2013.01); *Y02T 10/72* (2013.01); *Y10S 903/903* (2013.01)

(56) References Cited

U.S. PATENT DOCUMENTS

| | | | | |
|---|---|---|---|---|
| 2012/0231927 | A1* | 9/2012 | Beechie | ................ B60W 50/14 |
| | | | | 477/99 |
| 2016/0221466 | A1* | 8/2016 | Kim | ...................... B60W 10/08 |

FOREIGN PATENT DOCUMENTS

| | | | | |
|---|---|---|---|---|
| DE | 102007043586 A | * | 3/2009 | ............... B60K 6/48 |
| DE | 102007043586 A1 | | 3/2009 | |
| DE | 102007043586 A1 | * | 3/2009 | ............... B60K 6/48 |
| DE | 102012223867 A1 | | 6/2014 | |
| DE | 102012223867 A1 | * | 6/2014 | ............ B60L 1/003 |
| JP | 2007259611 A | | 10/2007 | |
| KR | 1019970072549 B1 | | 7/1999 | |
| WO | 2012005655 A1 | | 1/2012 | |
| WO | WO-2012005655 A1 | * | 1/2012 | ............ B60W 10/06 |
| WO | 2014003671 A1 | | 1/2014 | |
| WO | WO-2014003671 A1 | * | 1/2014 | ............ B60K 6/365 |
| WO | 2014055013 A1 | | 4/2014 | |
| WO | WO-2014055013 A1 | * | 4/2014 | ............ B60W 10/08 |
| WO | 2015067867 A2 | | 5/2015 | |

OTHER PUBLICATIONS

Korean Office Action for Korean Patent Application No. 10-2017-7013525 dated Oct. 4, 2018.

* cited by examiner

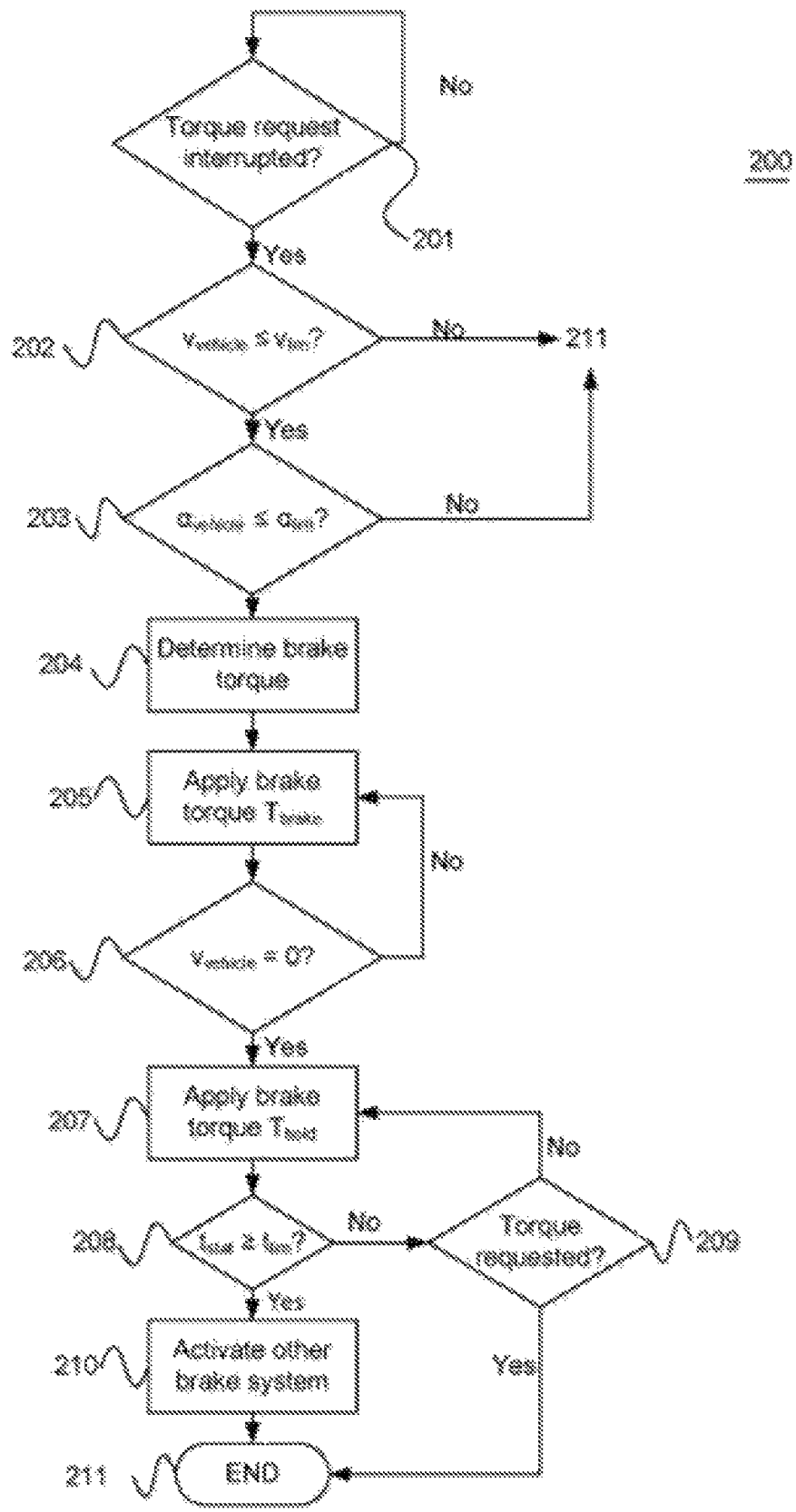

METHOD AND SYSTEM FOR DECELERATING A VEHICLE

CROSS-REFERENCE TO RELATED APPLICATION(S)

This application is a national stage application (filed under 35 § U.S.C. 371) of PCT/SE15/051089, filed Oct. 15, 2015 of the same title, which, in turn claims priority to Swedish Application No. 1451290-9 filed Oct. 29, 2014 of the same title; the contents of each of which are hereby incorporated by reference.

FIELD OF THE INVENTION

The present invention relates to vehicles, and in particular to a method and system for decelerating a vehicle. The present invention also relates to a vehicle, as well as a computer program product that implement the method according to the invention.

BACKGROUND OF THE INVENTION

With regard to vehicles in general, and at least to some extent heavy/commercial vehicles, such as trucks, buses and the like, there is constantly ongoing research and development with regard to increasing fuel efficiency and reducing exhaust emissions.

This is often at least partly due to growing governmental concern in pollution and air quality, e.g. in urban areas, which has also led to the adoption of various emission standards and rules in many jurisdictions.

Apart from governmental concern, one of the main expenses associated with vehicle operation is consumption of fuel for propulsion of the vehicle. The degree of utilization of heavy vehicles is often high, and with its associated fuel consumption, the cost of fuel can affect the profitability of the owner of the vehicle to a great extent.

In view of this, and in view of the fact that transport of goods on roads is expected to continuously increase, alternatives to conventional combustion engine technology are increasingly being considered.

For example, electric vehicles and hybrid-electric vehicles are undergoing extensive research and development. These vehicles often include an electrical machine, where the electrical machine is controlled by means of an inverter drive.

Commercial vehicles are often used for transportation of goods from one location to another, and, in general, spend a lot of time traveling on roads, for which reason a lot of effort in research and development with regard to such vehicles is spent on methods for reducing fuel consumption and making driving of the vehicle comfortable to the driver.

There are, however, also other aspects with regard to the use of commercial vehicles that are important from a driver point of view. For example, one important aspect in transportation of goods is maneuvering of the vehicle at low speeds e.g. when the vehicle is to be loaded and unloaded. In these situations the vehicle is often maneuvered with high precision at low speeds, e.g. when maneuvering the vehicle to and from loading docks/loading bays, and maneuvering is often carried out in situations when pedestrians frequently are present.

Maneuvering of this kind can involve a number of starts and stops with the vehicle moving backwards and forwards, and it is important that the vehicle behaves as expected by the driver to ensure that dangerous situations do not arise.

SUMMARY OF THE INVENTION

It is an object of the present invention to provide a method and system that facilitates maneuvering of a vehicle, in particular when the vehicle is moving at low speeds.

According to the present invention, it is provided a method for decelerating a vehicle, said vehicle comprising at least one electrical machine being arranged to provide a controllable torque to at least one drive wheel of said vehicle, said vehicle further including driver controllable means for actively requesting a torque for propelling the vehicle. The method includes, when a driver request for a propelling torque is reduced at least to a first extent:
  applying a first brake torque by means of said electrical machine,
  by means of said first brake torque decelerate said vehicle to a stationary state, and
  by means of said electrical machine, when said vehicle has been decelerated to said stationary state, continue applying a torque by means of said electrical machine to keep said vehicle in said stationary state by means of said torque applied by said electrical machine.

As was mentioned above, it is important that vehicles behave as expected by the driver, in particular in situations when vehicles are being maneuvered in places where space for maneuvering the vehicle is limited, and where high-accuracy maneuvering is required. For example, when a vehicle is about to load or unload goods at a loading dock, a number of forward and backward movements of the vehicle are often required in order to maneuver the vehicle to the desired position. These movements are usually made at low speeds where e.g. a combustion engine is connected to and disconnected from the vehicle drive wheels a number of times during the maneuvering, usually through the use of a clutch, the clutch oftentimes being of a dry clutch type.

It can, however, be difficult to perform high-accuracy maneuvering of the vehicle at low speeds when a clutch is used. When maneuvering the vehicle at low speeds the output shaft of the combustion engine often rotates at a different (higher) speed than the gearbox input shaft, with the result that the clutch is slipping, i.e. the clutch is partially engaged, and part of the work produced by the combustion engine is dissipated as friction losses over the clutch. The clutch slip allows the vehicle to be propelled at lower speeds than would otherwise be possible, and hence facilitates higher accuracy maneuvering. When the clutch is partially engaged sudden variations in engine speed that could otherwise translate to large changes in acceleration or engine braking when the drive train is closed are smoothed by the clutch slip, thereby further facilitating maneuvering of the vehicle.

However, clutch plates may engage and disengage in a non-linear manner, and if the clutch plates suddenly fully engage, i.e. the slip is suddenly reduced to zero, the full torque produced by the combustion engine will be transmitted to the vehicle drive wheels, with an unexpected increase in drive wheel torque as a result. If this occurs in a situation where distances to surrounding objects are small the sudden movement might challenge the driver and may cause the vehicle to accidentally contact surrounding objects with possible damage as result.

Furthermore, each time the vehicle is to be stopped to a stationary state, i.e. stand still, that is, the vehicle no longer being in motion, the driver must remove the foot from e.g.

an accelerator pedal to the brake pedal in order to stop the vehicle. The clutch often opens and closes a number of times in these situations, which in turn increases the possibility for sudden and unexpected movements of the vehicle caused by sudden clutch engagement that must be acted upon and compensated for by requesting further propelling torques and/or brake torques.

The present invention provides a solution to problems of this kind for use in vehicles that are equipped with an electrical machine being capable at least of providing a brake torque to the drive wheels of the vehicle. According to the invention, actions are being taken when a driver initiated request for torque is reduced at least to a first extent. According to one embodiment actions are being taken when a driver initiated request for torque is interrupted, i.e. when the driver initiated request for torque is reduced to zero, e.g. by removing the foot from an accelerator pedal. Vehicles, in general, comprise driver controllable means, e.g. a hand operated lever or knob, or foot operated pedal, for requesting a propelling torque (or force) for propulsion of the vehicle.

The driver controllable means for actively requesting a torque for propelling the vehicle can be movable in a movement region between a first end position and a second end position, where the request for torque can be arranged to be dependent on the position of said driver controllable means, and increase with movement from said first end position towards said second end position. According to one embodiment, actions are being taken not only when the driver controllable means are being released, but also when the driver controllable means is at a position at most 5%, or 10%, of the total movement region away from said first end position towards said second end position.

According to this embodiment, consequently, the driver can, e.g. keep an accelerator pedal slightly depressed while still benefiting from the present invention.

Normally, when the request for torque is interrupted, the vehicle continues by own force, affected only by driving resistance and drive train losses. According to the invention, a brake torque is applied by the electrical machine when the accelerator is released at least to some extent according to the above, and the vehicle is being decelerated to a stationary state, i.e. to stand still. Using the inventive method, the driver can simply remove e.g. the foot from an accelerator when it is desired to stop the vehicle. Consequently the driver need not actively request a brake torque by maneuvering of, e.g., a brake pedal.

Furthermore, in addition, the vehicle is not only decelerated to a stationary state by means of the electrical machine, but is also kept stationary by a continued applied torque by the electrical machine. The vehicle can be kept in the stationary state e.g. until the driver again requests a propelling torque and thereby release the brake torque. The vehicle can, according to one embodiment, be kept in said stationary state even when e.g. an accelerator pedal can be slightly depressed according to the above.

The present invention, consequently, provides a solution where the driver only needs to use e.g. an accelerator pedal (and appropriate setting of a gearbox) to alternately move the vehicle backwards/forwards and keep it in a stationary state. This makes deceleration of the vehicle faster than in situations where it is required to move the foot from the accelerator to brake pedal, and the use of the electrical machine also has the advantage that opening and closing a clutch is not required since rotation of electrical machines can be controlled to zero rotation, thereby eliminating unexpected effects e.g. if the clutch suddenly fully engages. Consequently, when the vehicle includes a combustion engine that is arranged to be selectively connected to at least one drive wheel by opening and closing a clutch, the present invention can be used such that the electrical machine is arranged to apply the brake torque when the clutch is open.

According to one embodiment, the vehicle is kept in said stationary state using the electrical machine for a first period of time, e.g. a first number of seconds, after which, if no request for a propelling torque has been made, another vehicle brake system, such as e.g. a service brake system, is activated to apply the required brake torque instead of the electrical machine so as to avoid unfavourable operation of the electrical machine, due to the rotor being stationary, for an extended period of time.

According to one embodiment, the present invention is only utilized for vehicle speeds being lower than a first speed e.g. 5 km/h, 10 km/h or 20 km/h. That is, the invention can be adapted to be used e.g. only in situations where frequent shifts between decelerating and accelerating the vehicle with intermediate stops of the vehicle can be expected.

According to a further embodiment, the present invention is only utilised in situations where the inclination of the surface upon which the vehicle is moving is relatively small e.g. having an inclination, upwards and/or downwards, being less than a first number of percent, e.g. less than 3% or less than 5%.

According to one embodiment, the present invention is utilised only if the vehicle driver has actively requested activation of the functionality provided by the present invention, e.g. by setting the vehicle in a ranging mode.

According to one embodiment, the vehicle is a parallel hybrid vehicle. According to one embodiment the vehicle is an electric vehicle.

Further characteristics of the present invention and advantages thereof are indicated in the detailed description of exemplary embodiments set out below and the attached drawings.

BRIEF DESCRIPTION OF THE DRAWINGS

FIG. 2 illustrates an exemplary method according to the present invention.

DETAILED DESCRIPTION OF INVENTION

Figure 1A:
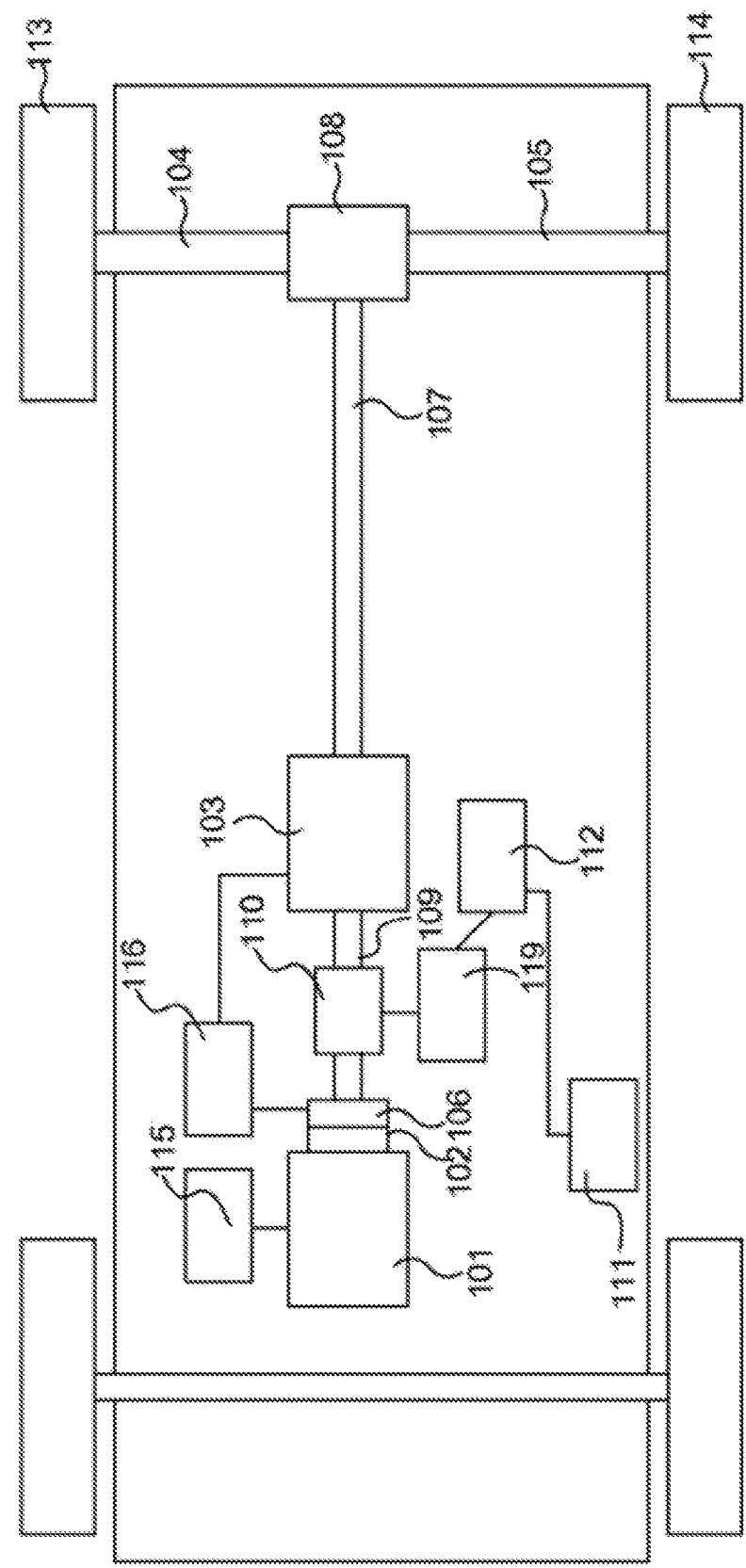
FIG. 1A illustrates a power train of an exemplary hybrid electric vehicle.

FIG. 1A schematically depicts a power train of an exemplary hybrid electric vehicle 100. The vehicle 100 in FIG. 1A is a parallel hybrid vehicle 100. The power train of the parallel hybrid vehicle in FIG. 1A comprises a combustion engine 101 which, in a conventional manner, is connected, via an output shaft of the engine 101, to a gearbox 103 via a clutch 106. The engine 101 is controlled by the vehicle's control system via a control unit 115. The clutch 106, which, for example, can be an automatically operated clutch, and the gearbox 103 are also controlled by the vehicle's control system by means of a control unit 116.

The vehicle also includes a hybrid portion with an electrical machine 110, which is connected to the input shaft 109 of the gearbox 103, downstream of the clutch 106, so that the gearbox input shaft 109 can be driven by the electrical machine 110 also when the clutch 106 is open, i.e. disengaged. Thereby, the parallel hybrid vehicle 100 can provide torque to drive wheels 113, 114 from two separate power sources simultaneously, i.e. both from the combustion engine 101 and from the electrical machine 110. Alternatively, the vehicle may be propelled by one power source at a time, i.e. either by the combustion engine 101 or the electrical machine 110. The combustion engine 101 can also be arranged to apply a power to the electrical machine 110.

The hybrid portion also comprises further components. FIG. 1A depicts part of these components, and shows the electrical machine 110, an inverter drive 119 for controlling the electrical machine 110, a power source, such as an energy storage, e.g. consisting of one or more batteries 111 and a hybrid control unit 112 which controls functions of the hybrid portion.

The inverter drive 119 in general, comprises switching means, e.g. in the form of transistors, to, by means of suitable switching, generate an AC voltage from a DC link/bus voltage to be supplied to the electrical machine 110. This allows e.g. amplitude and frequency of the terminal voltage of the stator phase windings to be controlled and thereby also the torque produced by and/or rotational speed of the electrical machine 110.

As indicated above, the functions of a vehicle are, in general, controlled by a number of control units, and control systems in vehicles of the disclosed kind generally comprise a communication bus system consisting of one or more communication buses for connecting a number of electronic control units (ECUs), or controllers, to various components on board the vehicle. Such a control system may comprise a large number of control units, and the control of a specific function may be divided between two or more of them.

For the sake of simplicity, FIG. 1A depicts only control units 112, 115-116 but vehicles 100 of the illustrated kind are often provided with significantly more control units, as one skilled in the art will appreciate. Control units 112, 115-116 can communicate with one another via said communication bus system, partly indicated by interconnecting lines in FIG. 1A.

The present invention can be implemented in any suitable control unit, and in the illustrated example the invention is implemented in control unit 112 for controlling the hybrid drive portion of the vehicle. The invention may, however, also be implemented in any other suitable control unit. The control of vehicle deceleration using the electrical machine 110 according to the present invention will usually depend on signals being received from other control units and/or vehicle components, and it is generally the case that control units of the disclosed type are normally adapted to receive sensor signals from various parts of the vehicle 100. The control unit 112 will, for example, receive control signals representing driver requests for torque. Control units of the illustrated type are also usually adapted to deliver control signals to various parts and components of the vehicle, e.g. to open a clutch when the vehicle is to be decelerated according to the invention. According to one embodiment of the present invention, the electrical machine is arranged to apply the brake torque at least when the clutch is open.

Control of this kind is often accomplished by programmed instructions. The programmed instructions typically consist of a computer program which, when it is executed in a computer or control unit, causes the computer/control unit to exercise the desired control, such as method steps according to the present invention. The computer program usually constitutes a part of a computer program product, wherein said computer program product comprises a suitable storage medium 121 (see FIG. 1B) with the computer program 126 stored on said storage medium 121.

The computer program can be stored in a non-volatile manner on said storage medium. The digital storage medium 121 can, for example, consist of any of the group comprising: ROM (Read-Only Memory), PROM (Programmable Read-Only Memory), EPROM (Erasable PROM), Flash memory, EEPROM (Electrically Erasable PROM), a hard disk unit etc, and be arranged in or in connection with the control unit, whereupon the computer program is executed by the control unit. The behavior of the vehicle in a specific situation can thus be adapted by modifying the instructions of the computer program.

Figure 1B:
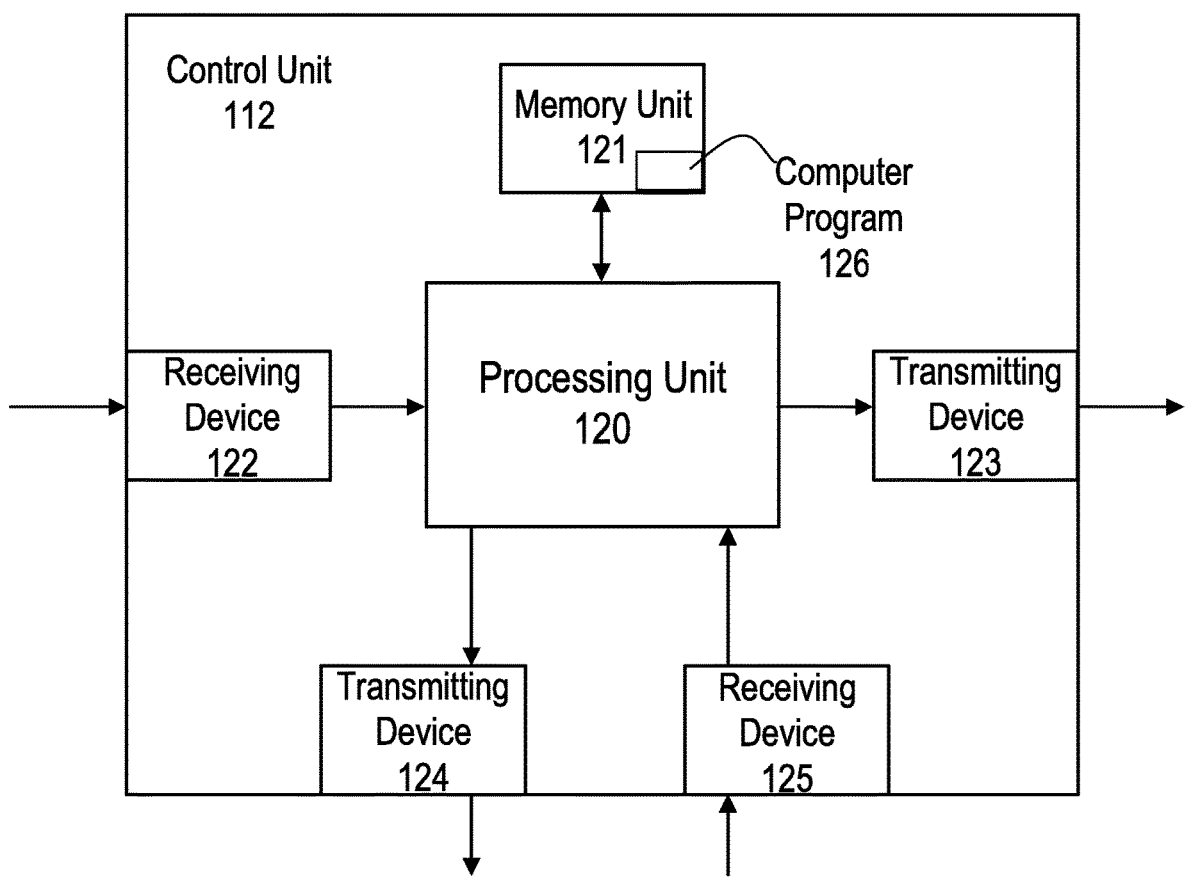
FIG. 1B illustrates an example of a control unit in a vehicle control system.

An exemplary control unit (the control unit 112) is shown schematically in FIG. 1B, wherein the control unit can comprise a processing unit 120, which can consist of, for example, any suitable type of processor or microcomputer, such as a circuit for digital signal processing (Digital Signal Processor, DSP) or a circuit with a predetermined specific function (Application Specific Integrated Circuit, ASIC). The processing unit 120 is connected to a memory unit 121, which provides the processing unit 120, with e.g. the stored program code 126 and/or the stored data that the processing unit 120 requires to be able to perform calculations. The processing unit 120 is also arranged so as to store partial or final results of calculations in the memory unit 121.

Furthermore, the control unit 112 is equipped with devices 122, 123, 124, 125 for receiving and transmitting input and output signals, respectively. These input and output signals can comprise waveforms, pulses or other attributes that the devices 122, 125 for receiving input signals can detect as information for processing by the processing unit 120. The devices 123, 124 for transmitting output signals are arranged so as to convert calculation results from the processing unit 120 into output signals for transfer to other parts of the vehicle control system and/or the component (s) for which the signals are intended. Each and every one of the connections to the devices for receiving and transmitting respective input and output signals can consist of one or more of a cable; a data bus, such as a CAN bus (Controller Area Network bus), a MOST bus (Media Oriented Systems Transport) or any other bus configuration, or of a wireless connection.

An exemplary embodiment 200 according to the present invention is illustrated in FIG. 2. The method starts in step 201, where it is determined whether a driver initiated request for a propelling torque is reduced to some extent, and according to the disclosed example it is determined whether the driver initiated request for torque is interrupted, i.e. the driver no longer requests a propelling torque. The method remains in step 201 when this is not the case. When the request for torque is interrupted the method continues to step 202. This can be determined e.g. using means for detecting the position of an accelerator pedal, or other means that are used by the driver for varying a request for torque, where it can be determined e.g. whether the accelerator pedal is fully released or not.

According to the disclosed embodiment, vehicle deceleration according to the invention is only carried out if the speed of the vehicle $v_{vehicle}$ equals or is lower than a speed limit $v_{lim}$. For example, the invention can be arranged to be utilised only when the vehicle is travelling at low speeds, where frequent shifts between acceleration and deceleration often occur and/or where precision in maneuvering is often performed. Therefore, it is determined in step 202 whether the speed of the vehicle $v_{vehicle}$ is less than the speed limit $v_{lim}$. If this is not the case, the method is ended in step 211. If the vehicle speed $v_{vehicle} \leq v_{lim}$, the method continues to step 203. The speed limit can, e.g. be any suitable speed limit in the range 0-20 km/h. According to one embodiment, vehicle deceleration according to the invention is carried out independently from the current vehicle speed when the method is initiated. Consequently, according to this alternative embodiment, step 202 is omitted.

Further, according to the disclosed embodiment, it is determined in step 203 whether the inclination $\alpha_{vehicle}$ of the surface upon which the vehicle is moving is less than an inclination limit $\alpha_{lim}$. According to the disclosed embodiment, the present invention is only utilised when the inclination is below said limit $\alpha_{lim}$, and otherwise the method is ended in step 211. The method continues to step 204 when the inclination is below said limit $\alpha_{lim}$. This limit can, for example, be any suitable inclination, positive or negative (i.e. irrespective of whether the vehicle is going uphill or downhill), in the range 0-5% inclination. The limit $\alpha_{lim}$ in inclination can be used e.g. to ensure that the load on the electrical machine is kept below some suitable load limit. As is explained below, keeping the vehicle at stand still may impose an unfavourable load one the electrical machine and/or the power electronics, and the limit $\alpha_{lim}$ in inclination can be used to control the magnitude of this load. The limit $\alpha_{lim}$ can, e.g., be arranged to depend on vehicle speed and/or current weight of the vehicle. Similar to what has been described with regard to vehicle speed, according to an alternative embodiment, vehicle deceleration according to the invention is carried out irrespective of the prevailing inclination. Consequently, according to this alternative embodiment, step 203 is omitted. The determination of inclination is well known per se to the person skilled in the art, and often estimated for e.g. when determining driving resistance.

In step 204 a brake torque $T_{brake}$ to be applied by the electrical machine 110 is determined. This brake torque $T_{brake}$ can, for example, be arranged to depend on the current vehicle speed $v_{vehicle}$, e.g. in order to ensure that the vehicle 100 is decelerated to a full stop, i.e. a stationary state, within a certain time or a certain distance. According to one embodiment, the brake torque $T_{brake}$ is determined so that a desired deceleration is obtained, e.g. any suitable deceleration in the range 0.1-2 m/s². The deceleration and/or brake torque $T_{brake}$ can further be arranged to vary as the vehicle decelerates, and hence need not be constant throughout the deceleration, although a constant deceleration might be to prefer from a driver point of view when predicting vehicle behavior. The determination of the brake torque can, for example, take the current inclination $\alpha_{vehicle}$ into account, e.g. so that a desired deceleration is obtained irrespective of whether the vehicle is currently moving in an upward or a downward slope.

The determination of brake torque can also be arranged to take the current weight of the vehicle into account, which also can be estimated using on board calculations. Estimation of the weight of the vehicle is also well known to the person skilled in the art.

Figure 3A:
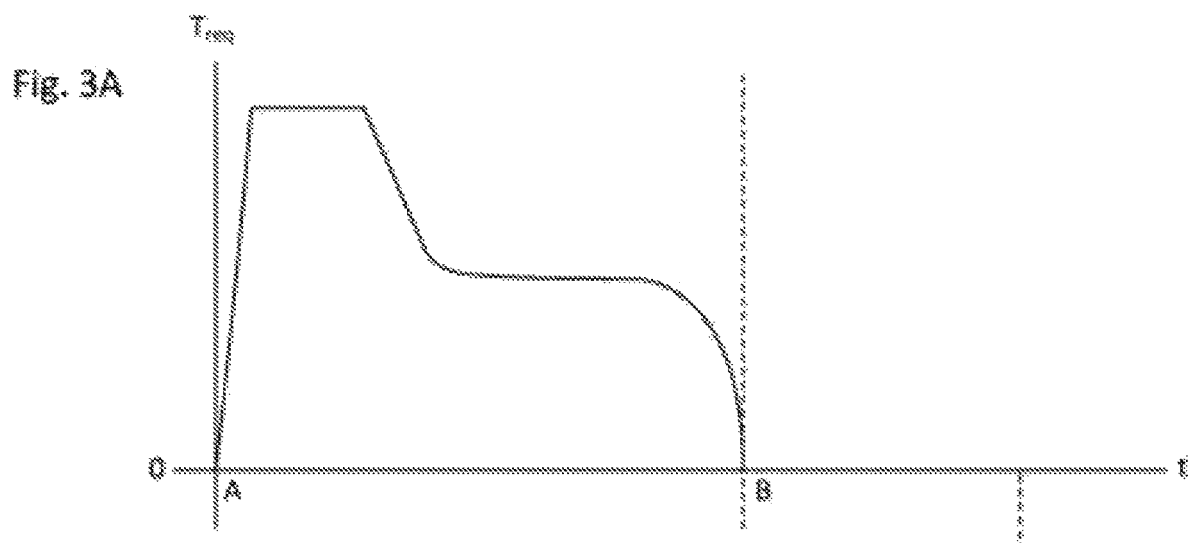
FIG. 3A-C illustrates an example of vehicle behavior using the present invention.
Figure 3B:
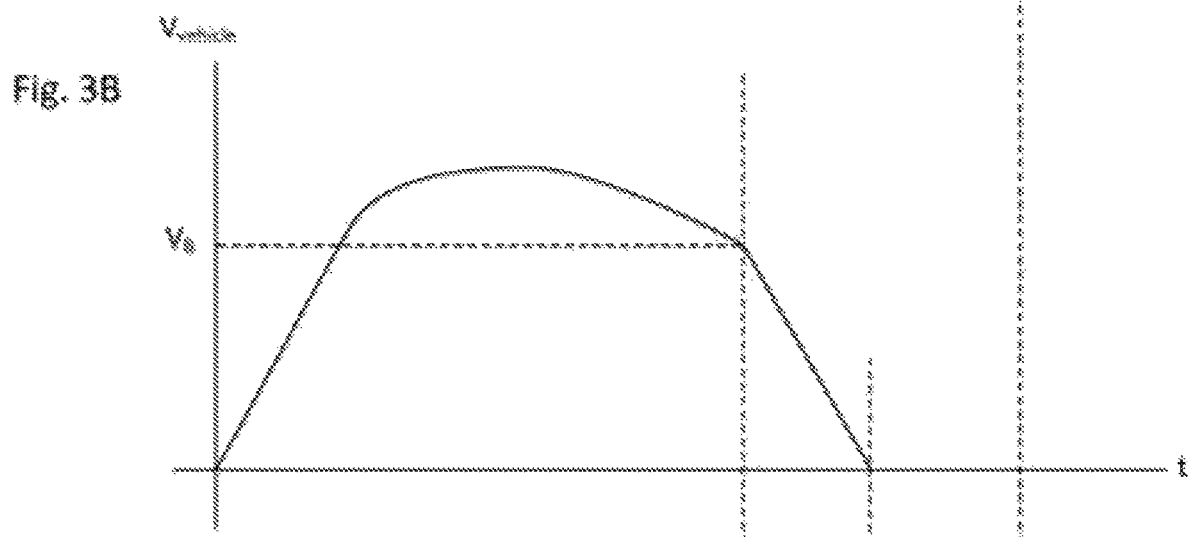
Figure 3C:
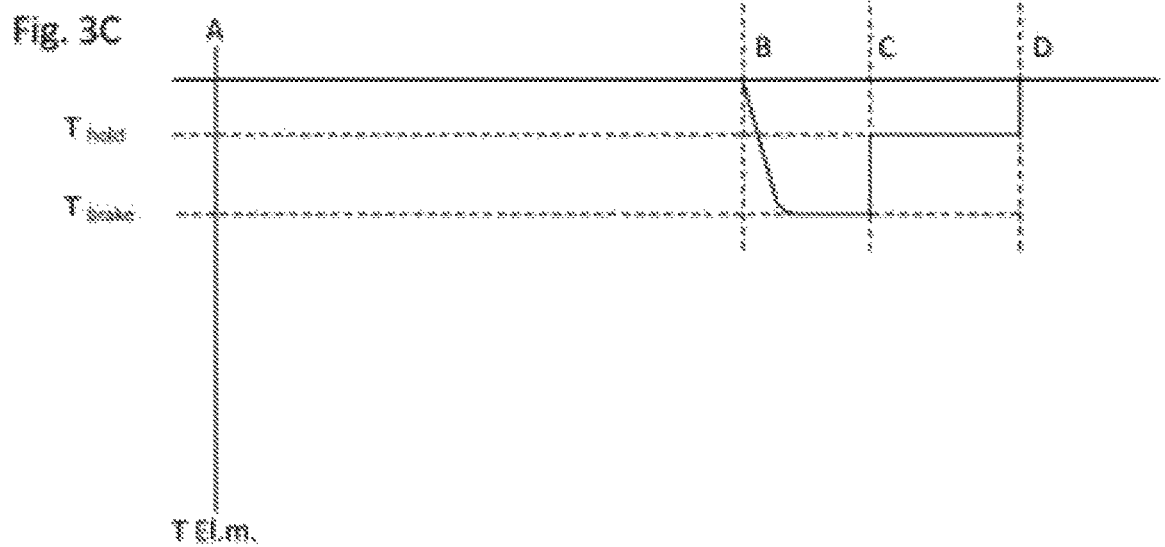

When a suitable brake torque $T_{brake}$ and/or brake torque profile to be used during the deceleration has been determined in step 204, the method continues to step 205 where the brake torque is applied. This is illustrated in FIGS. 3A-C, where FIG. 3A represents the torque requested by the driver, which can be determined e.g. on the depression of the accelerator pedal. The x-axis represents time, and the y-axis represents requested torque. FIG. 3B represents the vehicle speed $v_{vehicle}$ that correspond to the torque request of FIG. 3A, and FIG. 3C represents torque applied by the electrical machine 110, negative torque representing a braking torque. The brake torque profile can, e.g., constitute a representation of the manner in which the applied brake torque is to vary during the deceleration, e.g. as a function of vehicle speed or deceleration. That is, the deceleration need not be constant, and/or the deceleration can be maintained constant irrespective of variations in inclination of the surface upon which the vehicle is travelling.

A torque request is commenced at time A, resulting in the vehicle 100 being set in motion from a situation where the vehicle 100 is stationary. The vehicle is then driven according to the requested torque from time A to time B, where the accelerator pedal is fully released. Normally, in this situation, the vehicle 100 would continue its motion, subjected only to driving resistance and possible drive train losses, where the vehicle can accelerate or decelerate depending on the inclination of the surface upon which the vehicle 100 is travelling.

As can be seen from FIG. 3C, representing the torque produced by the electrical machine 110, a negative (braking) torque $T_{brake}$ is applied at time B, in the disclosed example from a substantially zero level, i.e. the propelling torque up to point B has been provided e.g. by the combustion engine 101. If the electrical machine 110 had been providing propelling power up to time B, a positive torque would have been delivered by the electrical machine 110 between time A and time B. The torque $T_{brake}$ can be arranged to be immediately applied at time B, or by means of e.g. a suitable ramping function, as shown in FIG. 3C, to smoothen the initial deceleration as experienced by the driver.

The speed of the vehicle $v_{vehicle}$ decreases, according to the disclosed example, by constant deceleration from time B to time C when the torque $T_{brake}$ is applied, and in step 206 it is determined whether the speed $v_{vehicle}$ of the vehicle 100 has reached zero speed, i.e. if the vehicle 100 has reached a stationary state. The method returns to step 205 for a continued apply of brake torque $T_{brake}$ when this is not the case. When the vehicle 100 is standing still the method continues to step 207, where the torque applied by the electrical machine 110 is maintained at $T_{brake}$ or reduced to a second brake torque $T_{hold}$, which can be, but not necessarily is, lower than the torque $T_{brake}$ applied during deceleration. The torque $T_{hold}$ can be set to a level where it can be ensured that the vehicle 100 is kept standing still, and preferably be lower than the torque $T_{brake}$ applied during deceleration to reduce energy consumption and wear of the electrical machine and/or e.g. components of the inverter drive 119 used in controlling the electrical machine 110. Even though electrical machines are capable of being controlled such that a brake torque can be applied when the vehicle, and hence the rotor of the electrical machine, is standing still, this can be harmful to the power electronics controlling the electrical machine. For example, when the vehicle 100 is standing still and the rotor of the electrical machine 110 hence is not rotating, all power is transferred through inverter drive switches of a single phase, and hence these switches may be subject e.g. to excessive heat with the potential risk of damages as result. For this reason the time during which the vehicle 100 is kept in a stationary state using the electrical machine can be arranged to be limited.

The method then continues to step 208, where it is determined whether the time $t_{stat}$ that the vehicle 100 has been standing still exceeds a first time limit $t_{lim}$. The time limit $t_{lim}$ can, for example, be some suitable number of seconds. Further, the time limit $t_{lim}$ can be arranged to depend on the applied torque, where longer time limits can be used for lower torques, and vice versa. For as long as this is not the case, i.e. the vehicle 100 has not been standing still for a longer period of time than the time $t_{lim}$, the brake torque $T_{hold}$ required to maintain the vehicle 100 stationary is continuously applied. This is exemplified in FIG. 3C from time C, where brake torque $T_{hold}$ is still applied by the electrical machine 110. If the driver of the vehicle 100 again depresses the accelerator pedal during this time to put the vehicle 100 in motion, step 209, the method is ended, step 211.

Further, the method of FIG. 2 can be controlled by an interrupt function that interrupts the process according to the invention as soon as the driver requests a propelling torque.

If the vehicle 100 has been standing still for a period of time equal to or exceeding the time limit $t_{lim}$, the method continues to step 210, where a second vehicle brake system is activated, and when said second brake system has been activated the brake torque applied by the electrical machine is partially reduced, or reduced to zero as in the present example. For example, the vehicle service brake system can be activated and arranged to apply a suitable brake torque to maintain the vehicle in a stationary state, so that torque applied by the electrical machine 110 no longer is required, e.g. to reduce wear according to the above. According to one embodiment, however, the vehicle is kept at a stationary state for as long as no other action, e.g. request for a propelling torque or activation of another vehicle brake system, is requested by the driver.

Deceleration of the vehicle using the electrical machine according to the present invention has the advantage that a very smooth braking action and hence deceleration of the vehicle 100 can be obtained without the risk of sudden and unexpected changes in applied drive wheel torque that otherwise might occur e.g. due to unexpected clutch behavior. The invention also provides a method that makes it very easy for the driver to maneuver the vehicle since only the accelerator pedal must be operated in order to accelerate and decelerate the vehicle, and maintain the vehicle in a stationary state.

According to one embodiment, the present invention is only activated when the vehicle is driven in a mode where the function might prove useful, e.g. in an actively selected ranging mode where one or more vehicle functions can be adapted for low speed maneuvering of the vehicle.

The invention claimed is:

1. A method for decelerating a vehicle, said vehicle comprising at least one electrical machine being arranged to provide a controllable torque to at least one drive wheel of said vehicle, said vehicle further comprising driver controllable means for actively requesting a torque for propelling the vehicle, and said vehicle comprising a combustion engine being arranged to be selectively connected to at least one drive wheel of said vehicle by opening and closing a clutch, wherein said method comprises, when a driver request for a propelling torque is reduced at least to a first extent:
applying a first brake torque by means of said electrical machine at least when said clutch is open;
by means of said first brake torque, decelerating said vehicle to a stationary state;
by means of said electrical machine, when said vehicle has been decelerated to said stationary state, continue applying a torque by means of said electrical machine to keep said vehicle in said stationary state by means of said torque applied by said electrical machine, wherein said steps of decelerating said vehicle to said stationary state and continue applying a torque to keep said vehicle in said stationary state occur while said clutch remains open;
after decelerating said vehicle to said stationary state and in response to said driver request for a propelling torque being increased, accelerating said vehicle by means of said electrical machine; and
after accelerating said vehicle and in response to said driver request for a propelling torque being decreased, decelerating said vehicle by applying said first brake torque by means of said electrical machine.

2. A method according to claim 1, said vehicle further comprising driver controllable means for actively requesting a brake torque, being different from said driver controllable means for actively requesting a torque for propelling the vehicle, said method further comprising:
determining whether a brake torque is requested by means of said driver controllable means for requesting a brake torque; and
applying said first brake torque at least when said clutch is open only when it is determined that no brake torque is requested by means of said driver controllable means for requesting a brake torque.

3. A method according to claim 1, further comprising:
keeping said vehicle in said stationary state using said electrical machine until the driver of said vehicle requests a propelling torque by means of said driver controllable means for actively requesting a torque for propelling the vehicle.

4. A method according to claim 2, further comprising:
keeping said vehicle in said stationary state using said electrical machine until the driver of said vehicle requests a brake torque using said driver controllable means for requesting a brake torque.

5. A method according to claim 1, further comprising:
when said vehicle is kept in said stationary state using said electrical machine, determining if said vehicle has been in said stationary state for a first period of time; and
when said vehicle has been kept in said stationary state using said electrical machine for said first period of time, applying a brake torque for keeping said vehicle in said stationary state using a vehicle brake system being different from said electrical machine.

6. A method according to claim 1, further comprising, prior to applying said first brake torque:
determining the speed of said vehicle; and
applying said first brake torque only when the speed of said vehicle is below a first speed limit.

7. A method according to claim 6, further comprising:
applying said first brake torque only when the speed of said vehicle is lower than 20 km/h or 10 km/h or 5 km/h.

8. A method according to claim 1, further comprising, prior to applying said first brake torque:
determining a first inclination of the surface upon which said vehicle is moving; and
applying said first brake torque only when said first inclination is below a first inclination limit.

9. A method according to claim 1, said vehicle further being arranged to be selectively driven according to a first mode or a second mode, where, in said second mode, a functionality of at least one function is different from a functionality of said at least one function in said first mode, and being adapted for low speed maneuvering of said vehicle, further comprising:
applying said first brake torque only when said vehicle is being driven in said second mode.

10. A method according to claim 9, further comprising:
applying said first brake torque only when said second mode has been actively selected by a driver of said vehicle.

11. A method according to claim 1, further comprising:
determining said first brake torque in dependence on the vehicle speed and/or the weight of the vehicle and/or the inclination of the surface upon which said vehicle is moving.

12. A method according to claim 1, further comprising:
determining said first brake torque such that said vehicle is decelerated to said stationary state within a second time or a first travelled distance.

13. A method according to claim 1, further comprising:
determining said first brake torque such that a first deceleration is obtained, said first deceleration being determined prior to determining said first brake torque.

14. A method according to claim 1, further comprising:
applying said brake torque when said driver request for a propelling torque is interrupted.

15. A method according to claim 1, said driver controllable means for actively requesting a torque for propelling the vehicle being movable in a movement region between a first end position and a second end position, the request for torque being arranged to be dependent on the position of said driver controllable means, the request for torque increasing with movement from said first end position towards said second end position, the method further comprising:
determining that said driver request for a propelling torque is reduced at least to said first extent when said driver controllable means is in a position at most 5% or 10% of the total movement region away from said first end position towards said second end position.

16. A method according to claim 1, wherein the steps of said method occur while said vehicle is on a non-inclined surface.

17. A computer program product comprising program code stored in a non-transitory computer-readable medium readable by a computer, said computer program product used for decelerating a vehicle, where said vehicle comprises at least one electrical machine being arranged to provide a controllable torque to at least one drive wheel of said vehicle; a combustion engine being arranged to be selectively connected to at least one drive wheel of said vehicle by opening and closing a clutch; and driver controllable means for actively requesting a torque for propelling the vehicle, wherein said computer program code comprising computer instructions to cause one or more computer processors to perform the following operations, when a driver request for a propelling torque is reduced at least to a first extent:
applying a first brake torque by means of said electrical machine at least when said clutch is open;
by means of said first brake torque decelerating said vehicle to a stationary state;
by means of said electrical machine, when said vehicle has been decelerated to said stationary state, continue applying a torque by means of said electrical machine to keep said vehicle in said stationary state by means of said torque applied by said electrical machine, wherein said steps of decelerating said vehicle to said stationary state and continue applying a torque to keep said vehicle in said stationary state occur while said clutch remains open;
after decelerating said vehicle to said stationary state and in response to said driver request for a propelling torque being increased, accelerating said vehicle by means of said electrical machine; and
after accelerating said vehicle and in response to said driver request for a propelling torque being decreased, decelerating said vehicle by applying said first brake torque by means of said electrical machine.

18. A system for decelerating a vehicle, said vehicle comprising at least one electrical machine being arranged to provide a controllable torque to at least one drive wheel of said vehicle; a combustion engine being arranged to be selectively connected to at least one drive wheel of said vehicle by opening and closing a clutch; and driver controllable means for actively requesting a torque for propelling the vehicle wherein when a driver request for a propelling torque is reduced at least to a first extent, said system comprises:
means for applying a first brake torque by means of said electrical machine at least when said clutch is open;
means for, by means of said first brake torque, decelerate said vehicle to a stationary state;
means for, by means of said electrical machine, when said vehicle has been decelerated to said stationary state, continue applying a torque by means of said electrical machine to keep said vehicle in said stationary state by means of said torque applied by said electrical machine, wherein said means of decelerating said vehicle to said stationary state and means of continue applying a torque to keep said vehicle in said stationary state occur while said clutch remains open;
after decelerating said vehicle to said stationary state and in response to said driver request for a propelling torque being increased, means for accelerating said vehicle by means of said electrical machine; and
after accelerating said vehicle and in response to said driver request for a propelling torque being decreased, means for decelerating said vehicle by applying said first brake torque by means of said electrical machine.

19. A vehicle comprising:
at least one electrical machine being arranged to provide a controllable torque to at least one drive wheel of said vehicle;
driver controllable means for actively requesting a torque for propelling the vehicle;
a combustion engine being arranged to be selectively connected to at least one drive wheel of said vehicle by opening and closing a clutch; and
a system for decelerating the vehicle, said system comprising, when a driver request for a propelling torque is reduced at least to a first extent:
means for applying a first brake torque by means of said electrical machine at least when said clutch is open;
means for, by means of said first brake torque, decelerate said vehicle to a stationary state;
means for, by means of said electrical machine, when said vehicle has been decelerated to said stationary state, continue applying a torque by means of said electrical machine to keep said vehicle in said stationary state by means of said torque applied by said electrical machine, wherein said means of decelerating said vehicle to said stationary state and means of continue applying a torque to keep said vehicle in said stationary state occur while said clutch remains open;
after decelerating said vehicle to said stationary state and in response to said driver request for a propelling torque being increased, means for accelerating said vehicle by means of said electrical machine; and after accelerating said vehicle and in response to said driver request for a propelling torque being decreased, means for decelerating said vehicle by applying said first brake torque by means of said electrical machine.

* * * * *